May 11, 1926.

F. L. SEARS

STORAGE BATTERY

Filed April 7, 1924

1,583,859

-Inventor-

Patented May 11, 1926.

1,583,859

UNITED STATES PATENT OFFICE.

FRED L. SEARS, OF NICHOLASVILLE, KENTUCKY.

STORAGE BATTERY.

Application filed April 7, 1924. Serial No. 704,658.

The invention relates to improvements in storage batteries, and the object of the improvement, is a visible built in hydrometer which, when attached to the cells of an ordinary storage battery, will not only show at a glance the condition of the battery, as to being fully charged or otherwise, but will also show at a glance whether or not the plates of the battery are covered (hereinafter called water line) sufficiently with the solution contained in the cells.

The form of the invention is illustrated in the accompanying drawing. Figure 1 showing glass tube (1) attached to wall of cell in battery (6); with attachments (2), (3), (4), and (5). No. 2 is flange of tube, No. 3 is lead gasket on inside of cell, No. 4 is nut, No. 5 is threads on end of tube, No. 7 is float.

There are numerous manufacturers of storage batteries and all vary in size, so, the length of tube and size, will necessarily have to conform to that particular battery cell on which the device is to be installed.

The manner in which the device is installed is done by boring two holes, the size of glass tube in the cell of the battery at the water line, near the top of cell and just over the plates of the battery; and the other, near the bottom of the cell, just below the plates. This will allow the fluid in the cell to enter the glass tube No. 1 Figure 1, and the float will show the condition of the battery after being charged. The upper portion of glass tube will show the water line.

Float 7 Figures 1 and 2, is made of glass or other suitable material, which will rise or fall as the battery is charged or discharged.

Figure 1:
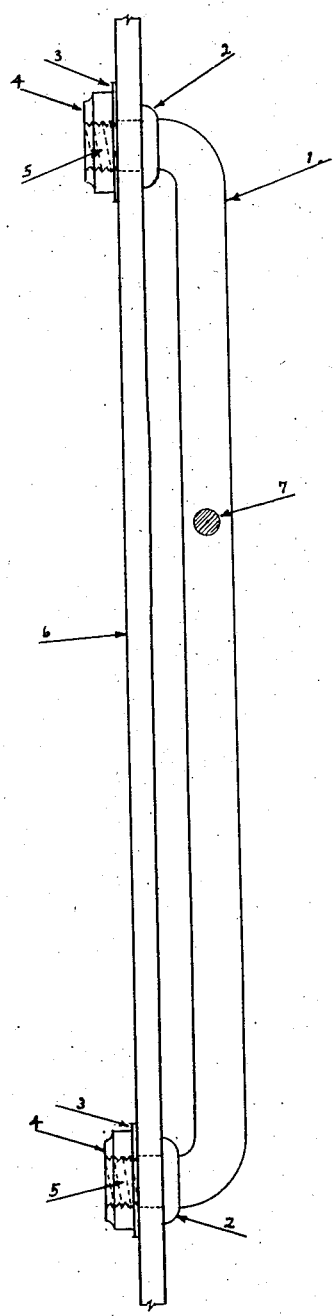
Figure 3:
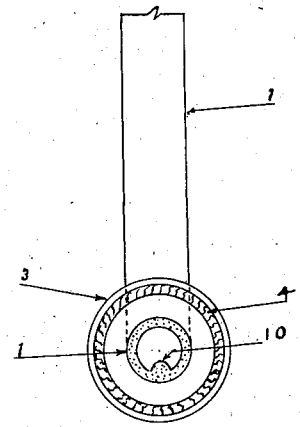
Figure 3 shows glass tube placed at bottom of cell and cell attachments, No. 1 tube, No. 3 gasket, No. 4 nut, and No. 10 small obstruction or lug built in tube which will keep float 7 Figures 1 and 2 from entering cell when fully discharged.
Figure 2:
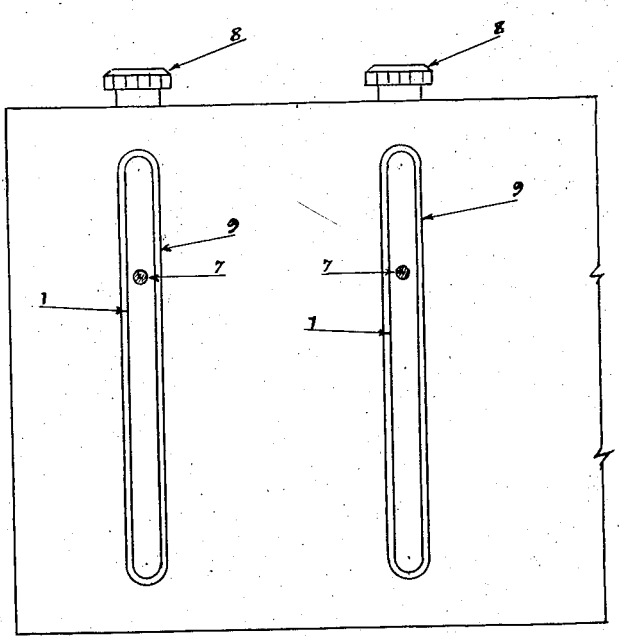
Figure 2 shows front view of ordinary storage battery, with elongated slots cut in box, which will allow tube and float to be seen at a glance, and water line at top. No. 1 glass tube No. 7 float No. 9 elongated slots No. 8 caps on ordinary storage battery.

The device herein described, which I will call storage battery self tester, shows the possibilities of attachments to "knocked down" batteries, but if manufacturer is impressed with the herein described device, the glass tube may be built in the cell at time of the manufacture, in a manner suitable to individual requirements—molded or attached as described. Glass tube to be made of suitable strength to withstand freezing temperatures. A gauge or suitable markings placed on side or elongated slots on battery box will show the condition of each cell.

I claim—

The combination with a conventional battery receptacle having opaque walls adapted to contain a battery solution, said receptacle having a pair of spaced openings in one of said walls, an attachment detachably secured to said receptacle, said attachment having a vertical transparent portion disposed exteriorly of and entirely independent of one wall of the receptacle, said vertically transparent portion near each end thereof being turned inwardly and adapted to enter the spaced openings in the wall, securing nuts for uniting said inturned ends to the battery wall, the ends of said vertical transparent portion being open to permit the entrance of the battery solution into said transparent portion to indicate the level thereof, and a hydrometer mounted in said vertical transparent attachment for designating the strength of the battery solution.

FRED L. SEARS.